Figure 1:
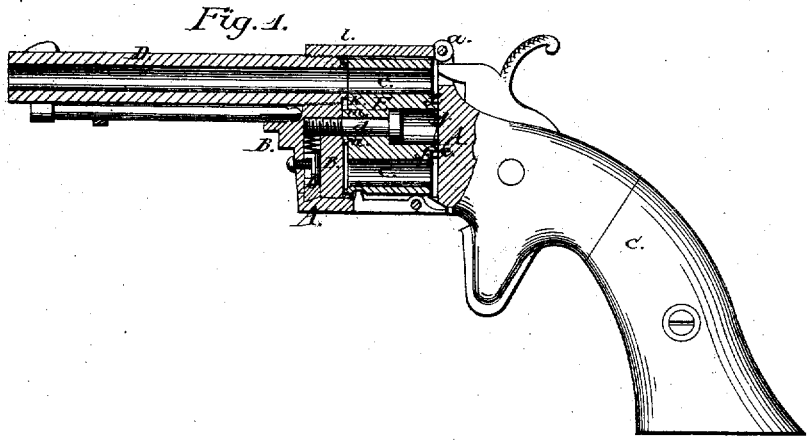

A. J. GIBSON.

Revolving Fire-Arms.

No. 5,813. Reissued March 31, 1874.

Witnesses:
Stephen E. Seymour
C. E. Buckland

Inventor:
Abram J. Gibson

AM. PHOTO-LITHOGRAPHIC Co. N.Y. (OSBORNE'S PROCESS.)

UNITED STATES PATENT OFFICE.

ABRAM J. GIBSON, OF SHREWSBURY, ASSIGNOR, BY MESNE ASSIGNMENTS, TO DANIEL B. WESSON, OF SPRINGFIELD, MASSACHUSETTS

IMPROVEMENT IN REVOLVING FIRE-ARMS.

Specification forming part of Letters Patent No. 29,126, dated July 10, 1860; reissue No. 5,813, dated March 31, 1874; application filed March 25, 1874.

*To all whom it may concern:*

Be it known that I, A. J. GIBSON, formerly of Worcester, in the county of Worcester and State of Massachusetts, now of Shrewsbury, Massachusetts, have invented a new and useful Improvement in that class of Fire-Arms known as Revolvers; and I do hereby declare that the following is a full, clear, and exact description and specification of the same, reference being had to the accompanying drawings forming part of this specification.

My invention relates to revolvers of that kind which have a many-chambered cylinder, rotating on an axis parallel with a stationary barrel, and having the chambers of the cylinder bored through so as to be open at the rear for the entrance of metallic cartridges.

The principal object of the invention is to provide greater facility for the loading of the chambers at the rear of the cylinder, without materially reducing the rigidity of the frame which connects the barrel with the stock, incloses the cylinder, and sustains the said cylinder and barrel.

The means by which these results are attained are the following, viz: The said frame is constructed of two sections, each consisting of an end of the frame and a bar rigidly attached thereto, one of said ends forming the recoil-plate in the rear of the chambers of the cylinder, and the other end being that to which the butt of the barrel is secured. The said cylinder is connected by a pivot or spindle with the forward section of the frame, to which the barrel is secured; and the said two sections of the frame are connected at its diagonally-opposite corners by a hinge-pivot that is arranged crosswise of the length of the barrel, and by a spring-bolt or other fastening. Hence the frame may be opened at one of its corners to permit its forward section, with the barrel and the cylinder, to be swung upon the hinge-pivot at the diagonally-opposite corner in a forward direction from the recoil-plate, so as to expose the open rear ends of the chambers of the cylinder; while, as the two horizontal bars of the frame are rigidly attached to their respective ends of the frame, both bars, when the frame is closed, combine to hold the cylinder and barrel from twisting laterally, and the frame when closed is practically rigid. My invention consists, further, of the construction of the hinge-jointed cylinder-frame with recesses in its front and rear to receive within them the entire circumferences of the front and rear ends of the cylinder, for the prevention of the escape of the fire, and the protection of the hand from being burned. And, lastly, my invention consists of a cylinder, having the chambers bored through, and also having an annular groove at its front end to receive the rear end of the barrel, so that lead, escaping laterally at the seam between the barrel and the cylinder, is turned in forward direction.

To enable others skilled in the art to make and use my invention, I have represented in the accompanying drawings, and will proceed to describe, the construction and operation of a pistol embodying it in the best form devised by me previous to the application for my original patent.

Figure 2:
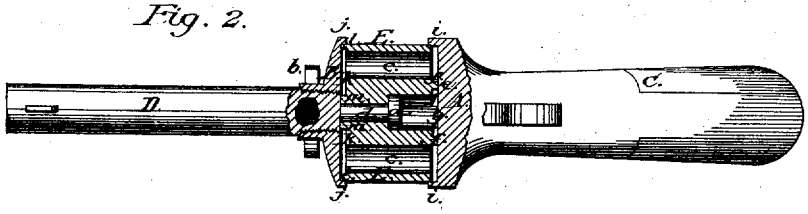
Figure 3:
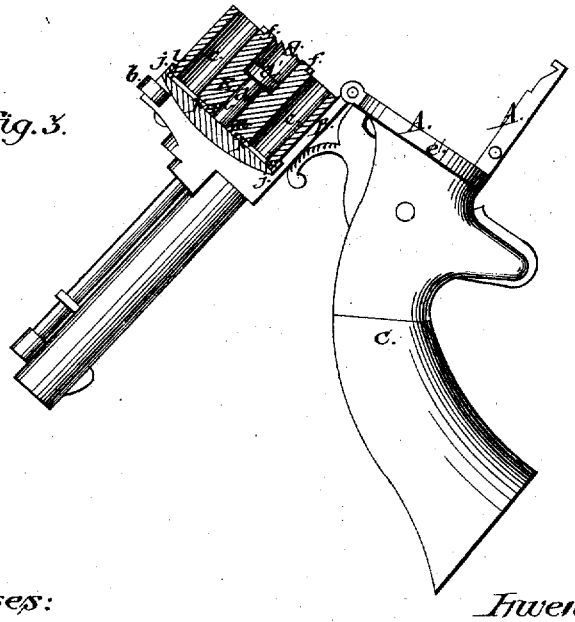

Figure 1 is a side view, mostly in section, of a pistol constructed according to my invention, representing its parts in proper relative positions for use. Fig. 2 is a top view of the same, partly in section. Fig. 3 is a side view, partly in section, representing it in condition for loading.

Similar letters of reference indicate corresponding parts in the several figures.

In the said drawings, A and B represent the two sections of which the cylinder-frame is composed, the section A constituting the recoil-plate and the lower bar of the frame, and having the stock C attached, and the section B constituting the front end and the upper bar of said frame, and having the barrel D secured to it. These two sections are hinged together at one corner, *a*, of the frame, the pivot of the hinge being arranged crosswise of the length of the barrel, as seen in the drawings. The sections of the frame also are connected at the corner diagonally opposite the hinge-pivot by a spring-bolt, *b*, or other suitable fastenings. E is the cylinder having the chambers *c c* extended right through its rear. This cylinder is bored out centrally to receive an axis-pin, *d*, which passes through it and screws into the end piece of the forward section B of the frame; the said pin having a broad head,

*d*, which secures the cylinder to the section B, and which is countersunk into the rear portion of the cylinder to make the screw entirely independent of the rear section A of the frame. By thus attaching the cylinder to the front piece B, so that when the frame is opened it (the cylinder) swings forward from the recoil-plate *e* along with the front part of the frame and the barrel, it is obvious that great facility is afforded for loading the chambers at the rear; as, on the frame being opened, as shown in Fig. 3, the open rear ends of all the chambers are exposed at once, and can be loaded, one after the other, without moving the cylinder. When the chambers are all loaded, the frame is closed up again, and the pistol is ready for use.

It is almost unnecessary to say that, with the cylinder having its chambers extended right through its rear, it will be desirable, if not necessary, to use metallic cartridges, and I propose to use that kind having a flange round the base to contain percussion priming, and for this purpose I provide a space between the cylinder and the recoil-plate all round the cylinder, excepting immediately around the central or axis hole of the cylinder, where I leave a projection, *f*, to fit against the recoil-plate, and in this projection I form the ratchet-notches *g g*, in which works the dog, by which the revolution of the cylinder, by the act of cocking the hammer, is effected.

The construction of the frame of the pistol with recesses in its front and rear to receive the ends of the cylinder within them, is best illustrated in Fig. 2. The recess in the rear is formed by making a forwardly-projecting rim, *i i*, all round the recoil-plate; and the recess in front is formed by making a backward-projecting rim, *j j*, all round the front end of the frame, which is made of circular form. The interiors of these rims are made to fit the exterior of the cylinder as snugly as practicable. The front end of the cylinder has an annular recess or groove, *k*, formed in it. The mouths of the chambers being within the marginal position *l* of the cylinder, fit up snugly to the front of the frame, and so does the portion *m* immediately surrounding the pin *d*. By thus providing a groove in the cylinder, lead, which may escape laterally at the seam between the barrel and the front of the cylinder, is diverted in a forward direction by the rim at the exterior of said groove.

I do not claim the extension of the chambers through the rear of the cylinder; nor the construction of the frame in two pieces with a hinge-joint; nor the combination of the cylinder with a frame divided into sections, one of which is pivoted to the other in every mode; but

What I claim as my invention, and desire to secure by Letters Patent, is—

1. The combination, substantially as before set forth, of the barrel, the sectional frame having rigid upper and lower bars, the hinge-pivot arranged crosswise of the length of the barrel at one corner of said frame, the fastening at the corner of the said frame diagonally opposite the hinge-pivot, and the cylinder having its chambers open at the rear.

2. The combination, substantially as before set forth, of the cylinder having its chambers extended through its rear, with the hinge-jointed frame constructed with recesses to receive the front and rear ends of the cylinder.

3. The combination, substantially as before set forth, of the cylinder of chambers, constructed with the annular groove in its front end, with the barrel having its rear end projecting into said groove.

Witness my hand this 12th day of March, A. D. 1874.

ABRAM J. GIBSON.

Witnesses:
STEPHEN E. SEYMOUR,
C. E. BUCKLAND.